United States Patent [19]
Roadfeldt

[11] 3,806,169
[45] Apr. 23, 1974

[54] CONDUIT ADAPTER
[75] Inventor: James L. Roadfeldt, Minneapolis, Minn.
[73] Assignee: Shallbetter Industries Inc., Golden Valley, Minn.
[22] Filed: May 18, 1972
[21] Appl. No.: 254,442

[52] U.S. Cl............... 285/177, 285/139, 285/141, 285/DIG. 2, 285/DIG. 4
[51] Int. Cl............................................. F16l 33/18
[58] Field of Search.......... 285/177, DIG. 2, DIG. 4, 285/138, 139, 141, 146, 7; 24/263 HA, 263 SC, 263 DL

[56] References Cited
UNITED STATES PATENTS

| | | | |
|---|---|---|---|
| 2,733,938 | 2/1956 | Davis | 285/146 |
| 2,153,770 | 4/1939 | Nixon | 24/263 HA |
| 3,479,065 | 11/1969 | Bahlke et al. | 285/177 X |
| 1,483,953 | 2/1924 | Rainey | 285/DIG. 2 UX |
| 1,096,278 | 5/1914 | Sutton | 285/DIG. 2 UX |
| 1,755,572 | 4/1930 | Church | 24/263 DL |
| 3,239,254 | 3/1966 | Campbell | 285/DIG. 4 UX |
| 3,127,198 | 3/1964 | Orund | 285/146 |
| 3,148,895 | 9/1964 | Jasper et al. | 285/7 |
| 3,565,464 | 2/1971 | Wolf | 285/7 |
| 3,682,500 | 8/1972 | Hamrick | 285/7 |

Primary Examiner—Mervin Stein
Assistant Examiner—Philip C. Kannan
Attorney, Agent, or Firm—Lew Schwartz; Wayne A. Sivertson

[57] ABSTRACT

An adapter for two conduits of differing sizes having two hinged body members which close around the smaller conduit. A seal is provided between the adapter and smaller conduit by way of a rib which extends from each of the body members. A tapering portion is provided on the body members for insertion into the larger conduit.

9 Claims, 14 Drawing Figures

PATENTED APR 23 1974          3,806,169

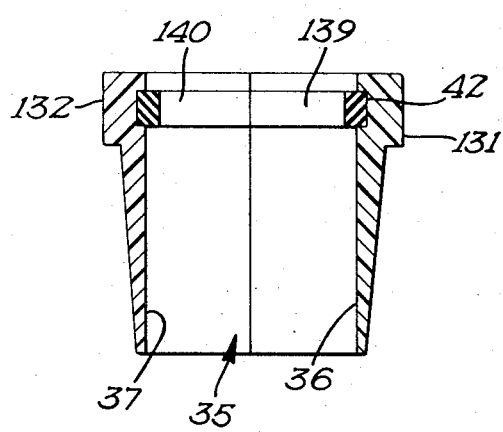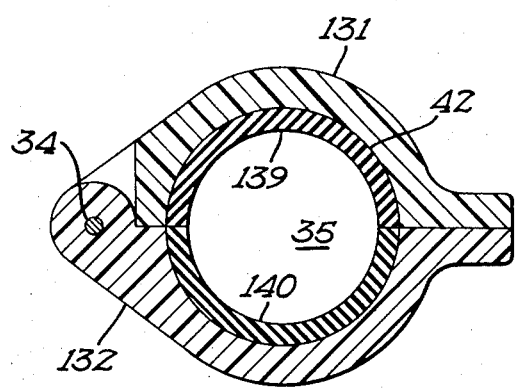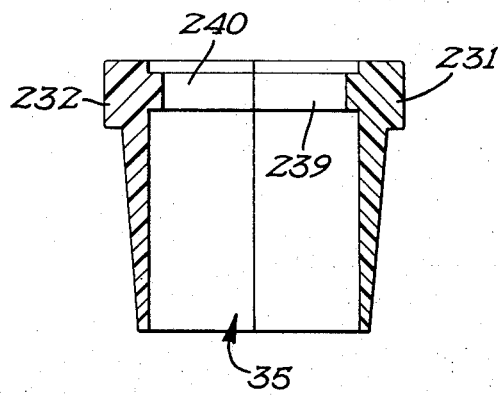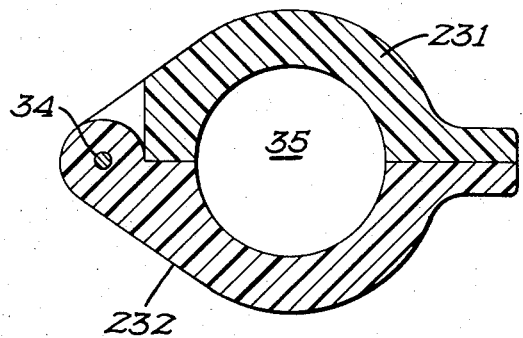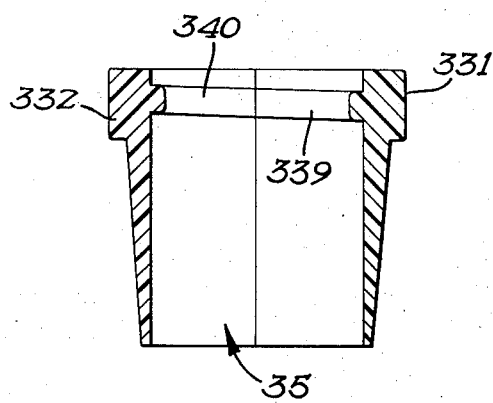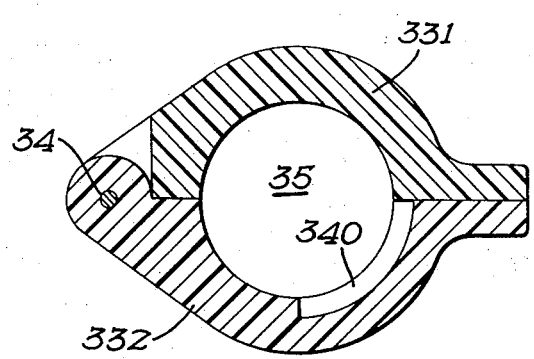

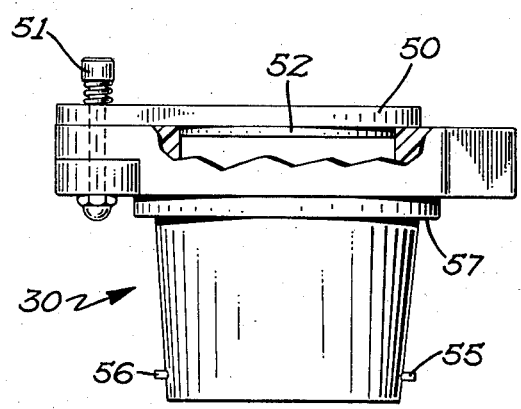
Fig 11
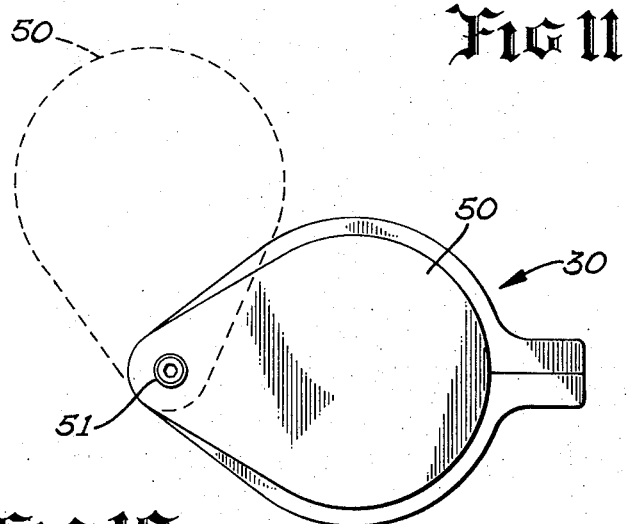
Fig 12
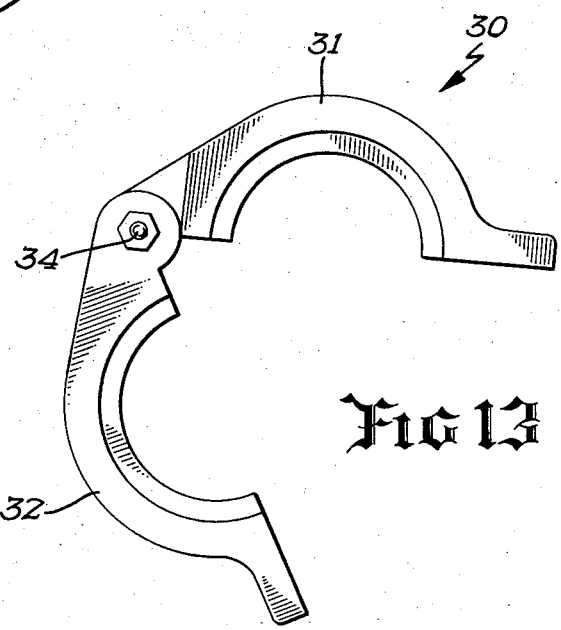
Fig 13
Fig 14

3,806,169

CONDUIT ADAPTER

BACKGROUND OF THE INVENTION

The increasing popularity of towed and truck mounted campers has led to an increase in the number of sites available for their use. Along with this has come an increase in convenience facilities at the campsites such as water and power connections as well as waste disposal systems which cooperate with the traditional accomodations on board the camper. Of the latter, the most common system consists of an underground receptable which has a pipe or other conduit extending up above the ground. Modern campers have a flexible conduit which is easily inserted into this pipe through which the wastes from the camper are disposed of.

One of the difficulties encountered by campers has been the odor generated by these tanks and the lack of a system for preventing the escape of these odors into the air. A solution which is commonly seen is a rag or other pliant material stuffed between the pipe and the camper conduit. While this solution does provide some relief, it has some obvious shortcomings from both an operational and a sanitary standpoint.

The present invention provides an adapter which will fit around the smaller conduit from the camper and provide a seal between itself and the smaller conduit. The whole unit is then inserted into the available upstanding sewer pipe. The adapter can be carried by the camper from campsite to campsite or may be furnished by the campsite itself for use by successive campers. In the latter case, a cover may be provided on the adapter to close the otherwise open passageway from the waste tank to the atmosphere when the sewer pipe is not in use.

The objects, advantages and novel features of the present invention will become apparent from the following detailed description of the invention, when considered in conjunction with the accompanying drawings.

BRIEF DESCRIPTION OF THE DRAWINGS

FIG. 5 is a cross-sectional view of a preferred embodiment of the present invention taken along a line 5—5 in FIG. 3.

FIG. 6 is a cross-section of the same embodiment as FIG. 5 taken along the line 6—6 in FIG. 3.

FIG. 7 is a cross-section of another preferred embodiment of the present invention taken along the line 5—5 in FIG. 3.

FIG. 8 is a cross-section of the embodiment of FIG. 7 taken along the line 6—6 in FIG. 3.

FIG. 9 is a cross-section of still another preferred embodiment taken along the line 5—5 in FIG. 3.

FIG. 10 is a cross-section of the embodiment of FIG. 9 taken along the line 6—6 in FIG. 3.

FIG. 11 is a modification of any of the embodiments shown in FIGS. 5–10.

FIG. 12 is a top view of the modification shown in FIG. 11.

FIG. 13 is a top view of any of the embodiments of FIGS. 5–10.

FIG. 14 is a view taken along the line 14—14 of FIG. 3.

DETAILED DESCRIPTION OF THE DRAWINGS

Figure 1:
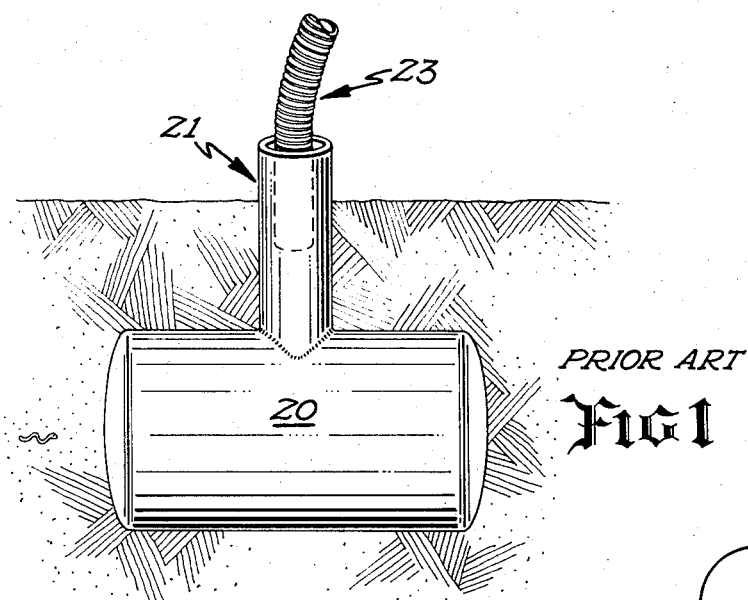
FIG. 1 shows the prior art method of connecting the camper to the underground tank.

FIG. 1 shows the prior art waste connection between camper and waste receptacle. Specifically what is shown is an underground tank 20 having an upstanding sewer pipe or conduit 21 extending above ground level. In practice, there may be, and often is, more than one pipe connection leading from the underground tank 20 to the surface. Only one such connection is shown here from simplicity. A flexible conduit 23, which is standard equipment on many modern campers, is shown inserted into the upstanding pipe 21. The size difference which is necessary for easy insertion of the conduit 23 also provides an outlet for odors from the underground tank 20 to the atmosphere.

Figure 3:
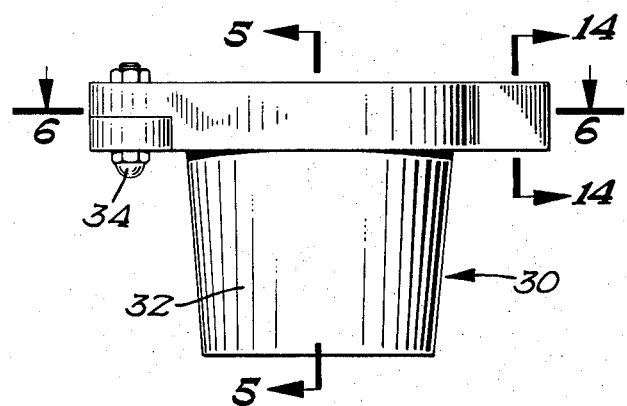
FIG. 3 is a side view showing the general outer configuration of the present invention.
Figure 2:
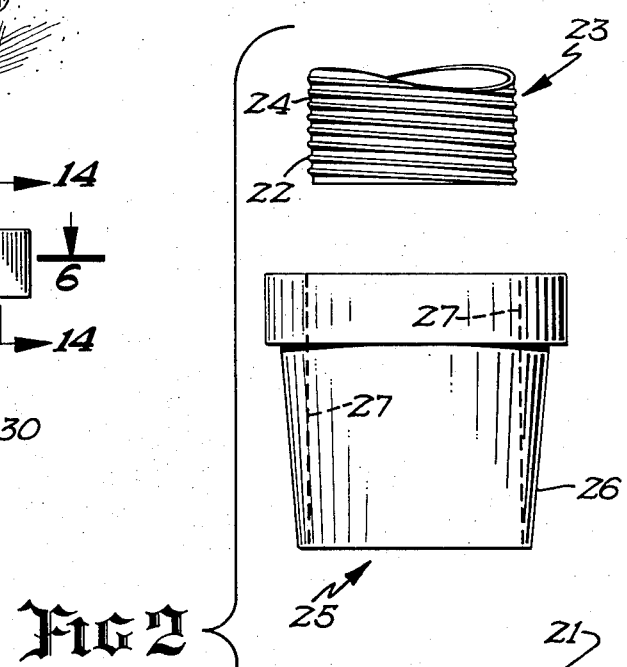
FIG. 2 is an exploded view showing the concept of the present invention.
Figure 4:
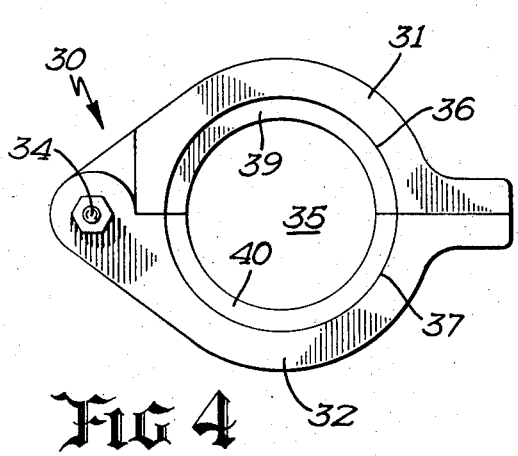
FIG. 4 is a top view of FIG. 3.

The concept of the present invention is illustrated in the exploded view of FIG. 2. Specifically what is shown is the above ground portion of the upstanding pipe 21 and the flexible conduit 23. The flexible conduit 23 is the type which is made of a helically coiled wire 22 having a web 24 extending between the wires. This particular conduit is illustrated here in that it is the most commonly employed. It is to be understood, however, that the present invention is not limited to this type of conduit and is easily adapted to other conduits, either flexible or non-flexible, as will become apparent from the description of the preferred embodiments. Between the conduits 21 and 23, there is shown an adapter 25 which has a tapered portion 26 and a central passageway here indicated by the dotted lines 27. The conduit 23 is placed into the adapter 25 and passes through the passageway. The tapered portion 26 of the adapter 25 is then placed into the upstanding pipe 21. The manner of insertion of the conduit 23, as well as the sealing between the conduit 23 and the adapter 25 will now be discussed in connection with the description of the preferred embodiments. The preferred embodiments disclosed herein all have the same general outward appearance which is shown in FIGS. 3 and 4. Essentially, the adapter of the present invention 30 consists of two body members 31 and 32 which are connected to pivot with respect to each other by means of a pin 34. The body members 31 and 32 may be made of any suitable material and may be formed by machining, molding or any other forming process. Each of the body members 31 and 32 have a groove in their surface, 36 and 37 respectively, which form a passageway 35 through the adapter 30 when the body members 31 and 32 are in the closed position shown in FIG. 4. The passageway 35 is of the same general configuration as the conduit the adapter is intended to accept. Extending from the side walls formed by the grooves 36 and 37 and into the passageway 35, are sealing means 39 and 40 which are different in the several embodiments disclosed herein.

Referring now to FIGS. 5 through 10, there are shown three of the preferred embodiments of the present invention in the form of cross-sectional views taken along the lines 5—5 and 6—6 in FIG. 3. Identical elements are referenced by identical reference numerals throughout the figures while functionally similar elements differ by a factor of 100. In FIGS. 5 and 6, there are shown cross-sections of a preferred embodiment taken along lines 5—5 and 6—6 in FIG. 3. Here the body members 131 and 132 are shown with a slot 42 extending around the passageway 35 side wall. Positioned within the slot 42 and extending into the passageway 35 are sealing members 139 and 140. If the conduit with which the members 139 and 140 are intended to cooperate is flexible, the members may be of a rigid material which operates as a seal by the contraction of the conduit. In the alternative, for either a rigid or a flexible conduit, the members 139 and 140 may be of a resilient material which itself will contract upon contacting the conduit. In either case, the members 139 and 140 should reduce the size of the passageway 35 to be slightly less than the size of the conduit to be inserted therein.

The embodiment shown in cross-section in FIGS. 7 and 8 is a modification of that shown in FIGS. 5 and 6, in that the members 239 and 240 which extend into the passageway 35 are a part of the body members 231 and 232. That is, the members 239 and 240 are unitary with the body members 231 and 232 and are formed as a part thereof when the body members themselves are formed. This embodiment is especially adapted for use with a flexible conduit and its operation is essentially as disclosed with respect to the embodiment of FIGS. 5 and 6.

Referring now to FIGS. 9 and 10 there is shown in cross-section a modification of the embodiment of FIGS. 7 and 8 in that the sealing members 339 and 340 are unitary with the body members 331 and 332 but form a helical arrangement within the passageway 35. This embodiment is particularly adapted for use with the conduit 23 as shown in FIG. 2 with the members 339 and 340 fitting between the coiled wires 22 and in contact with the web 24. The same helical arrangement could also be accomplished by means of a slot and insert along the lines of that shown in the embodiment of FIGS. 5 and 6 with the insert being either rigid or flexible as desired.

In operation, the body members 31 and 32 are pivoted around the pivot pin 34 to the open position shown in FIG. 13. The conduit to be held within the passageway 35 is then placed within the groove in one of the body members and the body members 31 and 32 are then pivoted relative to each other to the closed position shown in FIG. 4. To assure proper alignment between the body members, an alignment pin may be provided in one of the body members with a cooperating groove in the other. Such a pin is shown at reference numeral 58 in FIG. 14 which is a cross-sectional view taken along the line 14—14 in FIG. 2. With the body members closed around the conduit, the adapter then is simply inserted into the upstanding pipe 21. The adapter now will maintain the conduit 23 within the upstanding pipe 21 and will provide a seal against the escape of odors from the underground tank 20.

A modification which may be applied to any of the embodiments of FIGS. 5–10 is shown in FIG. 11. FIG. 11 is a partial cutaway of a view generally identical to that of FIG. 2 with the addition of a cover 50 which will seal the passageway 35 when the adapter is not in use. The cover 50 is pivoted around the pin 34 and is spring-biased against the top of the adapter 30 by means of the spring connection 51 in a known manner. Extending from the cover 50 may be a portion 52 of the same configuration and general size as the passageway 35 which, when the cover is in the covering position, lies within the passageway 35 to provide a better seal. The cover pivots between the covering position shown in FIG. 12 to the non-covering position (shown in phantom in FIG. 12) to allow insertion of the conduit.

FIG. 11 also shows two extending post members 55 and 56 which may be added to the adapter 30 to cooperate with a bayonet type fastening device in the upstanding pipe 21. As another alternative, screw threads may be added to facilitate the sealing between the adapter and the upstanding pipe. In either of these instances, it may be deemed desirable to add a resilient ring 57 to the adapter 30 which will sit on top of the upstanding pipe 21 to insure an even more reliable seal.

Obviously, many other modifications and variations of the present invention are possible in light of the above teachings. An example of such a modification might be to substitute a ring for the pivot pin 34 either in the vertical position such that the body members pivot as with the pin 34 or in a horizontal position such that the body members pivot relative to each other while moving along the circumference of the ring. It is therefore to be understood that, within the scope of the appended claims, the invention may be practiced otherwise than as specifically described.

What is claimed is:

1. An adapter for use with conduit of different sizes comprising:

a first body member having a groove in its surface;
a second body member having a groove in its surface;

cover means;
means pivotally connecting said first body member, said second body member and said cover means to each other for independent pivotal movement about a common axis;
said body members being pivotally moveable, with respect to each other, between an open and a closed position, the grooves in the surface of said body members being in substantial alignment, when the body members are in the closed position, to define a passageway having a configuration generally similar to that of the smaller conduit;
said cover means being pivotally moveable, with respect to said body members, into and out of a closing position wherein it overlies said passageway, said means for pivotally connecting said body members and cover means including spring-biased means acting along said pivot axis for spring-biasing said cover means against movement away from said body members;
means within the passageway for providing a seal between the body member and the smaller conduit; and
a tapering portion on each of the body members combining, when the body members are in the closed position, to form a truncated substantially conical section.

2. The adapter of claim 1 wherein the cover means is provided with an extending portion of the same general size and configuration as the passageway, the cover means extending portion lying within the passageway when the cover is in the closing position.

3. The adapter of claim 1 wherein the passageway has a generally circular cross-section.

4. The adapter of claim 1 wherein the means for providing a seal comprises a means extending out from the passageway side wall.

5. The adapter of claim 4 wherein there is a circumferential slot within the passageway side wall, the means for providing a seal lying within said slot and extending into said passageway.

6. The adapter of claim 5 wherein the means for providing a seal comprises a resilient material.

7. The adapter of claim 4 wherein the means extending out from the passageway side wall comprises at least one rib on each of said body members.

8. The adapter of claim 7 wherein each rib end meets a rib end on an adjacent body member when the body members are in the closed position.

9. The adapter of claim 7 wherein the ribs assume a generally helical arrangement when the body members are in the closed position.

* * * * *